(12) United States Patent
Makhervaks et al.

(10) Patent No.: US 7,343,527 B2
(45) Date of Patent: Mar. 11, 2008

(54) RECOVERY FROM ISCSI CORRUPTION WITH RDMA ATP MECHANISM

(75) Inventors: Vadim Makhervaks, Yokneam (IL); Giora Biran, Zichron-Yaakov (IL); Zorik Machulsky, Gesher HaZiv (IL); Kalman Zvi Meth, Netanya (IL); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 10/905,812

(22) Filed: Jan. 21, 2005

(65) Prior Publication Data

US 2006/0168306 A1    Jul. 27, 2006

(51) Int. Cl.
G06F 11/00    (2006.01)

(52) U.S. Cl. ........................................................ 714/49
(58) Field of Classification Search .................. 714/49
See application file for complete search history.

(56) References Cited

U.S. PATENT DOCUMENTS

| | | | | |
|---|---|---|---|---|
| 7,043,578 B2* | 5/2006 | Hufferd | ........................ | 710/105 |
| 2004/0049600 A1* | 3/2004 | Boyd et al. | .................. | 709/250 |
| 2004/0093411 A1* | 5/2004 | Elzur et al. | .................. | 709/224 |
| 2005/0228922 A1* | 10/2005 | Tsao et al. | .................... | 710/268 |
| 2005/0240941 A1* | 10/2005 | Hufferd et al. | ............. | 719/321 |

* cited by examiner

Primary Examiner—Michael C Maskulinski
(74) Attorney, Agent, or Firm—Ira D. Blecker; Wenjie Li

(57) ABSTRACT

A method and system for detecting and managing an error detected in an iSCSI (Internet Small Computer System Interface) PDU (Protocol Data Unit) by using a RDMA (Remote Direct Memory Access) dedicated receive error queue for error recovery.

20 Claims, 13 Drawing Sheets

RECOVERY FROM ISCSI CORRUPTION WITH RDMA ATP MECHANISM

FIELD OF THE INVENTION

The present invention relates generally to communication protocols between a host computer and an input/output (I/O) device, and more particularly to iSCSI (Internet Small Computer System Interface) offload implementation by Remote Direct Memory Access (RDMA).

BACKGROUND OF THE INVENTION

Remote Direct Memory Access (RDMA) is a technique for efficient movement of data over high-speed transports. RDMA enables a computer to directly place information in another computer's memory with minimal demands on memory bus bandwidth and CPU processing overhead, while preserving memory protection semantics. RNIC is a Network Interface Card that provides RDMA services to the consumer. The RNIC may provide support for RDMA over TCP (transport control protocol).

One of the many important features of the RNIC is that it can serve as an iSCSI (Internet Small Computer System Interface) target or initiator adapter. iSCSI defines the terms initiator and target as follows: "initiator" refers to a SCSI command requester (e.g., host), and "target" refers to a SCSI command responder (e.g., I/O device, such as SCSI drives carrier, tape). The RNIC can also provide iSER ("iSCSI Extensions for RDMA") services. iSER is an extension of the data transfer model of iSCSI, which enables the iSCSI protocol to take advantage of the direct data placement technology of the RDMA protocol. The iSER data transfer protocol allows iSCSI implementations with the RNIC to have data transfers which achieve true zero copy behavior by eliminating TCP/IP processing overhead, while preserving compatibility with iSCSI infrastructure. iSER uses RDMA wire protocol, and is not transparent to the remote side (target or initiator). It also slightly changes or adapts iSCSI implementation over RDMA; e.g., it eliminates such iSCSI PDUs as DataOut and DataIn, and instead uses RDMA Read and RDMA Write messages. Basically iSER presents iSCSI-like capabilities to the upper layers, but the protocol of data movement and wire protocol is different.

iSCSI protocol exchanges iSCSI Protocol Data Units (PDUs) to execute SCSI commands provided by the SCSI layer. The iSCSI protocol may allow seamless transition from the locally attached SCSI storage to the remotely attached SCSI storage. The iSCSI service may provide a partial offload of iSCSI functionality, and the level of offload may be implementation dependent. In short, iSCSI uses regular TCP connections, whereas iSER implements iSCSI over RDMA. iSER uses RDMA connections and takes advantage of different RDMA capabilities to achieve better recovery capabilities, improve latency and performance. Since RNIC supports both iSCSI and iSER services, it enables SCSI communication with devices that support different levels of iSCSI implementation. Protocol selection (iSCSI vs. iSER) is carried out on the iSCSI login phase.

RDMA uses an operating system programming interface, referred to as "verbs", to place work requests (WRs) onto a work queue. An example of implementing iSER with work requests is described in U.S. patent application Ser. No. 20040049600 to Boyd et al., assigned to International Business Machines Corporation. In that application, work requests that include an iSCSI command may be received in a network offload engine from a host, and in response to receiving the work request, a memory region associated with the host may be registered in a translation table. As in RDMA, the work request may be received through a send queue, and in response to registering the memory region, a completion queue element may be placed on a completion queue.

SUMMARY OF THE INVENTION

The present invention seeks to provide iSCSI functionality with RNIC mechanisms developed for RDMA, as is described more in detail hereinbelow.

In accordance with a non-limiting embodiment of the invention, a SCSI (Small Computer System Interface) buffer memory may be registered by RDMA (Remote Direct Memory Access) ATP (Address Translation and Protection) Fast Memory Registration. Further features are described hereinbelow.

It is noted that the terms buffer and memory are used interchangeably throughout the specification and claims.

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

Figure 1:
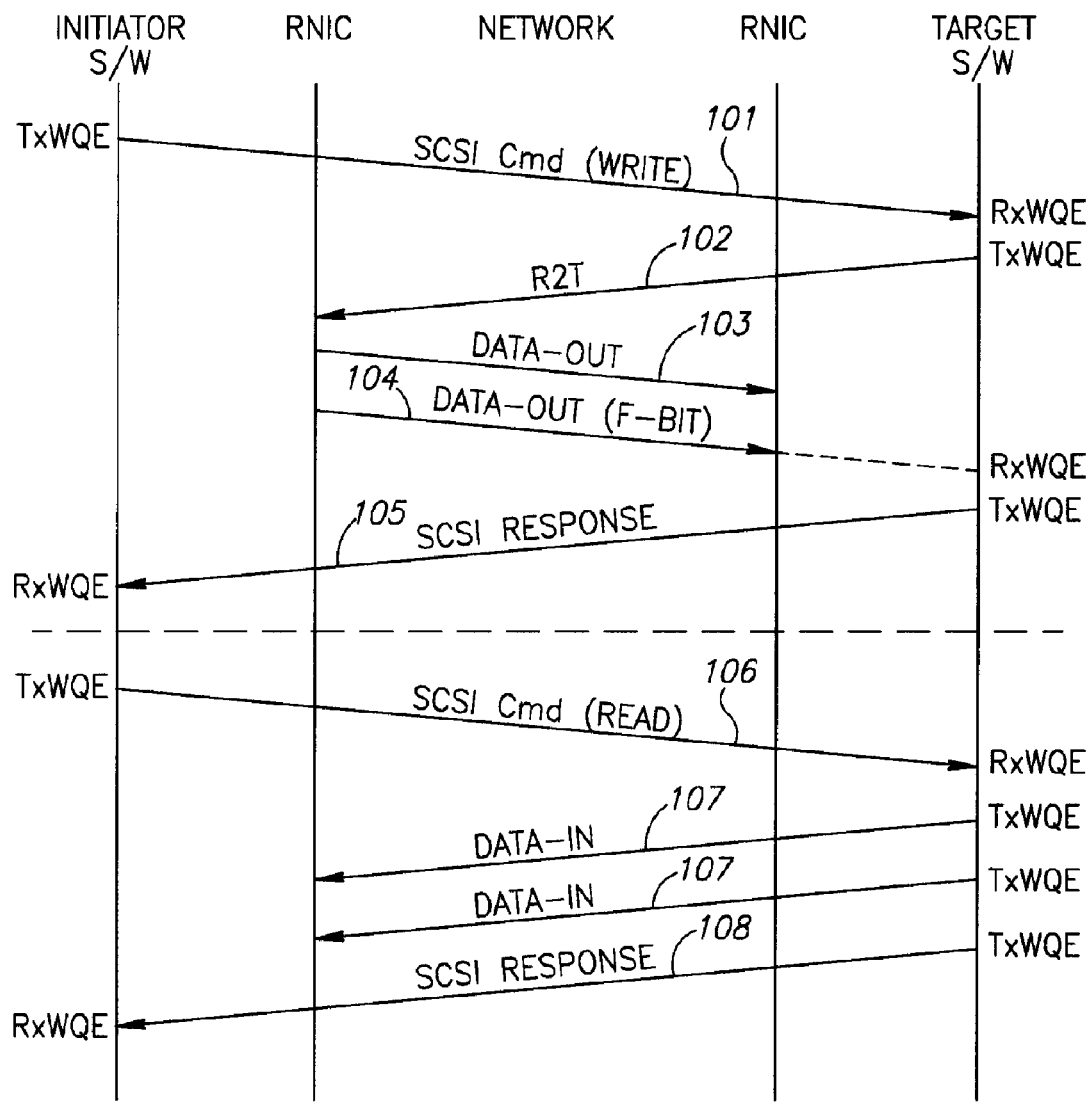
FIG. 1 is a simplified flow chart of SCSI write and SCSI read transactions.
Figure 2:
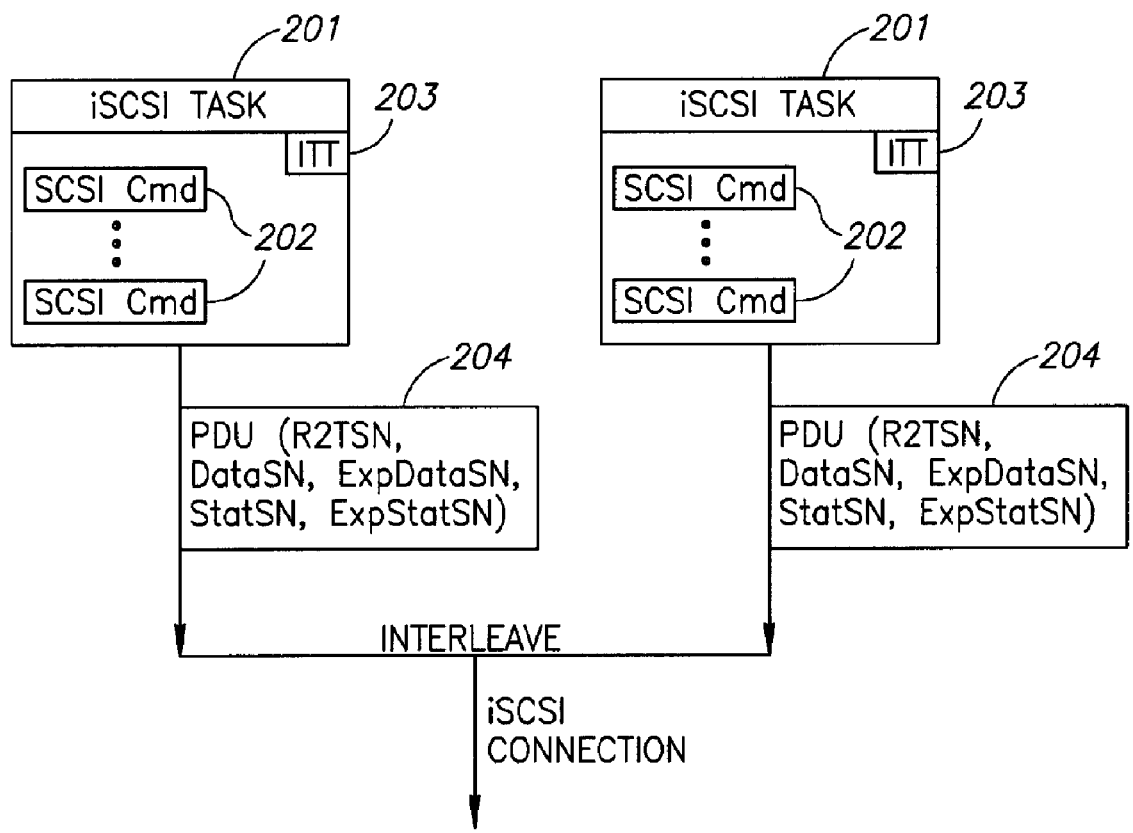
FIG. 2 is a simplified flow chart of iSCSI protocol, showing sequencing rules and SCSI commands.

In order to better understand the invention, a general explanation is now presented for iSCSI data movement and offload functionality (with reference to FIGS. 1 and 2). Afterwards, implementing the iSCSI data movement and offload functionality in a distributed computer system (described with reference to FIG. 3) with RDMA verbs and mechanisms (from FIG. 4 and onwards) will be explained.

The iSCSI protocol exchanges iSCSI Protocol Data Units (PDU) to execute SCSI commands provided by a SCSI layer. The iSCSI protocol enables seamless transition from the locally attached SCSI storage to the remotely attached SCSI storage.

There are two main groups of iSCSI PDUs: iSCSI Control and iSCSI Data Movement PDUs. iSCSI Control defines many types of Control PDU, such as SCSI command, SCSI Response, Task Management Request, among others. Data Movement PDUs is a smaller group that includes, without limitation, R2T (ready to transfer), SCSI Data-Out (solicited and unsolicited) and SCSI Data-In PDUs.

As mentioned above, "initiator" refers to a SCSI command requester (e.g., host), and "target" refers to a SCSI command responder (e.g., I/O device, such as SCSI drives carrier, tape). All iSCSI Control and Data Movement commands can be divided by those generated by the initiator and handled by the target, and those generated by the target and handled by the initiator.

Reference is now made to FIG. 1, which illustrates a flow of SCSI write and SCSI read transactions, respectively.

In the SCSI write flow, the initiator sends a SCSI write command (indicated by reference numeral 101) to the target. This command carries among other fields an initiator task tag (ITT) identifying the SCSI buffer that should be placed to the disk (or other portion of the target). The SCSI write command can also carry immediate data, the maximal size of which may be negotiated at iSCSI logic phase. In addition, the SCSI write command can be followed by so-called unsolicited Data-Out PDUs. Unsolicited Data-Out PDU is identified by a target transfer tag (TTT) in this case TTT should be equal to 0×FFFFFFFF. The size of unsolicited data is also negotiated at iSCSI login phase. These two data transfer modes may enable reducing the latency on short SCSI write operations, although this also can be used to transfer initial amounts of data in a large transaction as well. The maximal data size that can be transferred in unsolicited or immediate mode depends on buffering capabilities of the target.

After the target receives the SCSI write command, the target responds with one or more R2Ts (indicated by reference numeral 102). Each R2T indicates that the target is ready to receive a specified amount of data from the specified offset in the SCSI buffer (not necessarily in-order). R2T carries two tags: ITT from SCSI command, and TTT, which indicates the target buffer into which the data is to be placed.

For each received R2T, the initiator may send one or more Data-Out PDUs (indicated by reference numeral 103). The Data-Out PDUs carry the data from the SCSI buffer (indicated by ITT). Each received Data-Out carries TTT which indicates where to place the data. The last received Data-Out also carries an F-bit (indicated by reference numeral 104). This bit indicates that the last Data-Out has been received, and this informs the target that the R2T exchange has been completed.

When the target has been informed that all R2Ts have been completed, it sends a SCSI Response PDU (indicated by reference numeral 105). The SCSI Response carries ITT and indicates whether the SCSI write operation was successfully completed.

In the SCSI read flow, the initiator sends a SCSI read command to the target (indicated by reference numeral 106). This command carries among other fields the ITT, identifying the SCSI buffer to read the data thereto.

The target may respond with one or more Data-In PDUs (indicated by reference numeral 107). Each Data-In carries the data to be placed in the SCSI buffer. Data-Ins can come in arbitrary order, and can have arbitrary size. Each Data-In carries the TTT identifying the SCSI buffer and the buffer offset to place the data thereto.

The stream of the Data-In PDUs is followed by a SCSI Response (indicated by reference numeral 108). SCSI Response carries the ITT, indicating whether the SCSI read operation was successfully completed.

It is noted that in accordance with an embodiment of the present invention, unlike the prior art, the RNIC handles the flow of the Data-Outs and Data-Ins and R2T.

Reference is now made to FIG. 2, which illustrates an example of iSCSI protocol. The iSCSI protocol has well-defined sequencing rules. An iSCSI task (reference numeral 201) comprises one or more SCSI commands 202. At any given time, the iSCSI task 201 may have a single outstanding command 202. Each task 201 is identified by an ITT 203. A single iSCSI connection may have multiple outstanding iSCSI tasks. A PDU 204 of the iSCSI tasks 201 can interleave in the connection stream. Each iSCSI PDU 204 may carry several sequence numbers. The sequence numbers relevant to the data movement PDUs include, without limitation, R2TSN (R2T sequence number), DataSN and ExpDataSN, and StatSN and ExpStatSN.

DataSN is carried by each iSCSI PDU 204 which carries the data (Data-Out and Data-In). For Data-Ins, the DataSN may start with 0 for each SCSI read command, and may be incremented by the target with each sent Data-In. The SCSI Response PDU, following Data-Ins, carries a sequence number ExpDataSN which indicates the number of Data-Ins that were sent for each respective SCSI command. For bi-directional SCSI commands, the DataSN is shared by Data-Ins and R2Ts, wherein the R2T carries R2TSN instead of DataSN, but these are different names for the same field, which has the same location in an iSCSI Header (BHS—Buffer Segment Handle Stack).

For Data-Outs the DataSN may start with 0 for each R2T, and may be incremented by the initiator with each Data-Out sent. The R2TSN may be carried by R2Ts. R2TSN may start with zero for each SCSI write command, and may be incremented by the target with each R2T sent.

Both DataSN and R2TSN may be used to follow the order of received data movement PDUs. It is noted that iSCSI permits out-of-order placement of received data, and out-of-order execution of R2Ts. However, iSCSI requests implementation from the initiator and target to prevent placement of already placed data or execution of already executed R2Ts.

StatSN and ExpStatSN may be used in the management of the target response buffers. The target may increment StatSN with each generated response. The response, and potentially the data used in that command, may be kept in an internal target until the initiator acknowledges reception of the response using ExpStatSN. ExpStatSN may be carried by all iSCSI PDUs flowing in the direction from the initiator to the target. The initiator may keep the ExpStatSN monotonically increasing to allow efficient implementation of the target.

As mentioned above, in accordance with a non-limiting embodiment of the invention, the iSCSI offload function may be implemented with RNIC mechanisms used for RDMA functions. First, a general explanation of the concepts of work queues in RDMA for use in a distributed computer system is now explained.

Figure 3:
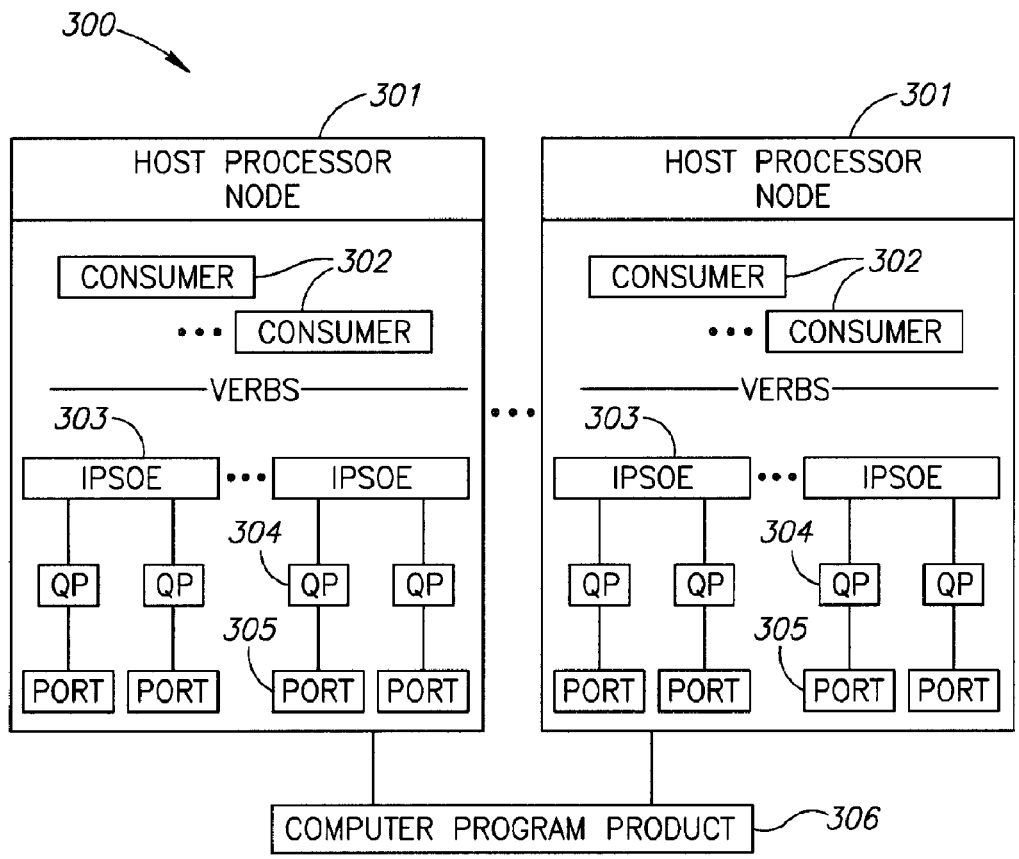
FIG. 3 is a simplified block diagram illustration of a distributed computer system, in accordance with an embodiment of the present invention.

Reference is now made to FIG. 3, which illustrates a distributed computer system 300, in accordance with an embodiment of the present invention. The distributed computer system 300 may include, for example and without limitation, an Internet protocol network (IP net and many other computer systems of numerous other types and configurations. For example, computer systems implementing the present invention can range from a small server with one processor and a few input/output (I/O) adapters to massively parallel supercomputer systems with a multiplicity of processors and I/O adapters. Furthermore, the present invention can be implemented in an infrastructure of remote computer systems connected by an internet or intranet.

The distributed computer system 300 may connect any number and any type of host processor nodes 301, such as but not limited to, independent processor nodes, storage nodes, and special purpose processing nodes. Any one of the nodes can function as an endnode, which is herein defined to be a device that originates or finally consumes messages or frames in distributed computer system 300. Each host processor node 301 may include consumers 302, which are processes executing on that host processor node 301. The host processor node 301 may also include one or more IP Suite Offload Engines (IPSOEs) 303, which may be implemented in hardware or a combination of hardware and offload microprocessor(s). The offload engine 303 may support a multiplicity of queue pairs 304 used to transfer messages to IPSOE ports 305. Each queue pair 304 may include a send work queue (SWQ) and a receive work queue (RWQ). The send work queue may be used to send channel and memory semantic messages. The receive work queue may receive channel semantic messages. A consumer may use "verbs" that define the semantics that need to be implemented to place work requests (WRs) onto a work queue. The verbs may also provide a mechanism for retrieving completed work from a completion queue.

For example, the consumer may generate work requests, which are placed onto a work queue as work queue elements (WQEs). Accordingly, the send work queue may include WQEs, which describe data to be transmitted on the fabric of the distributed computer system 300. The receive work queue may include WQEs, which describe where to place incoming channel semantic data from the fabric of the distributed computer system 300. A work queue element may be processed by hardware or software in the offload engine 303.

The completion queue may include completion queue elements (CQEs), which contain information about previously completed work queue elements. The completion queue may be used to create point or points of completion notification for multiple queue pairs. A completion queue element is a data structure on a completion queue that contains sufficient information to determine the queue pair and specific work queue element that has been completed. A completion queue context is a block of information that contains pointers to, length, and other information needed to manage the individual completion queues.

An RDMA read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region. Similarly, a RDMA write work queue element provides a memory semantic operation to write a virtually contiguous memory space on a remote node.

A bind (unbind) remote access key (Steering Tag—STag) work queue element provides a command to the offload engine hardware to modify (or destroy) a memory window by associating (or disassociating) the memory window to a memory region. The STag is part of each RDMA access and is used to validate that the remote process has permitted access to the buffer.

It is noted that the methods and systems shown and described hereinbelow may be carried out by a computer program product 306, such as but not limited to, Network Interface Card, hard disk, optical disk, memory device and the like, which may include instructions for carrying out the methods and systems described herein.

Figure 4:
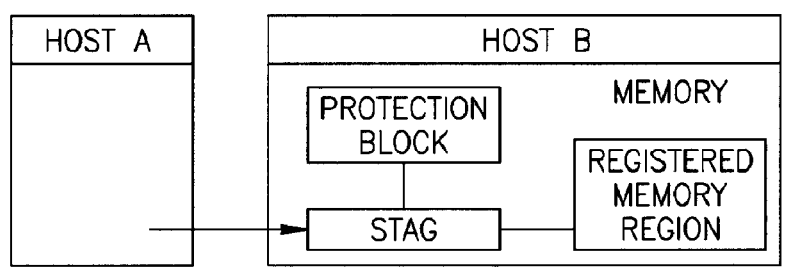
FIG. 4 is a simplified block diagram illustration of RDMA mechanisms for implementing the iSCSI offload functionality, in accordance with an embodiment of the present invention.

Some relevant and pertinent RDMA mechanisms for implementing the iSCSI offload functionality are now explained with reference to FIG. 4.

In RDMA, Host A may access the memory of Host B without any Host B involvement. Host A decides where and when to access the memory of Host B, and Host B is not aware that this access occur, unless Host A provides explicit notification.

Before Host A can access the memory of Host B, Host B must register the memory region that would be accessed. Each registered memory region gets a Stag. STag is associated with the entry in a data structure which is referred to as a Protection Block (PB). The PB fully describes the registered memory region including its boundaries, access rights, etc. RDMA permits registering of physically discontinuous memory regions. Such a region is represented by a page-list (or block-list). The PB also points to the memory region page-list (or block-list).

RDMA allows remote access only to the registered memory regions. The memory region STag is used by the remote side to refer to the memory when accessing it. For storage applications, RDMA accesses the memory region with zero-based access. In zero-based access, the target offset (TO), which is carried by a Tagged Direct Data Placement Protocol (DDP) segment, defines an offset in the registered memory region.

Figure 5:
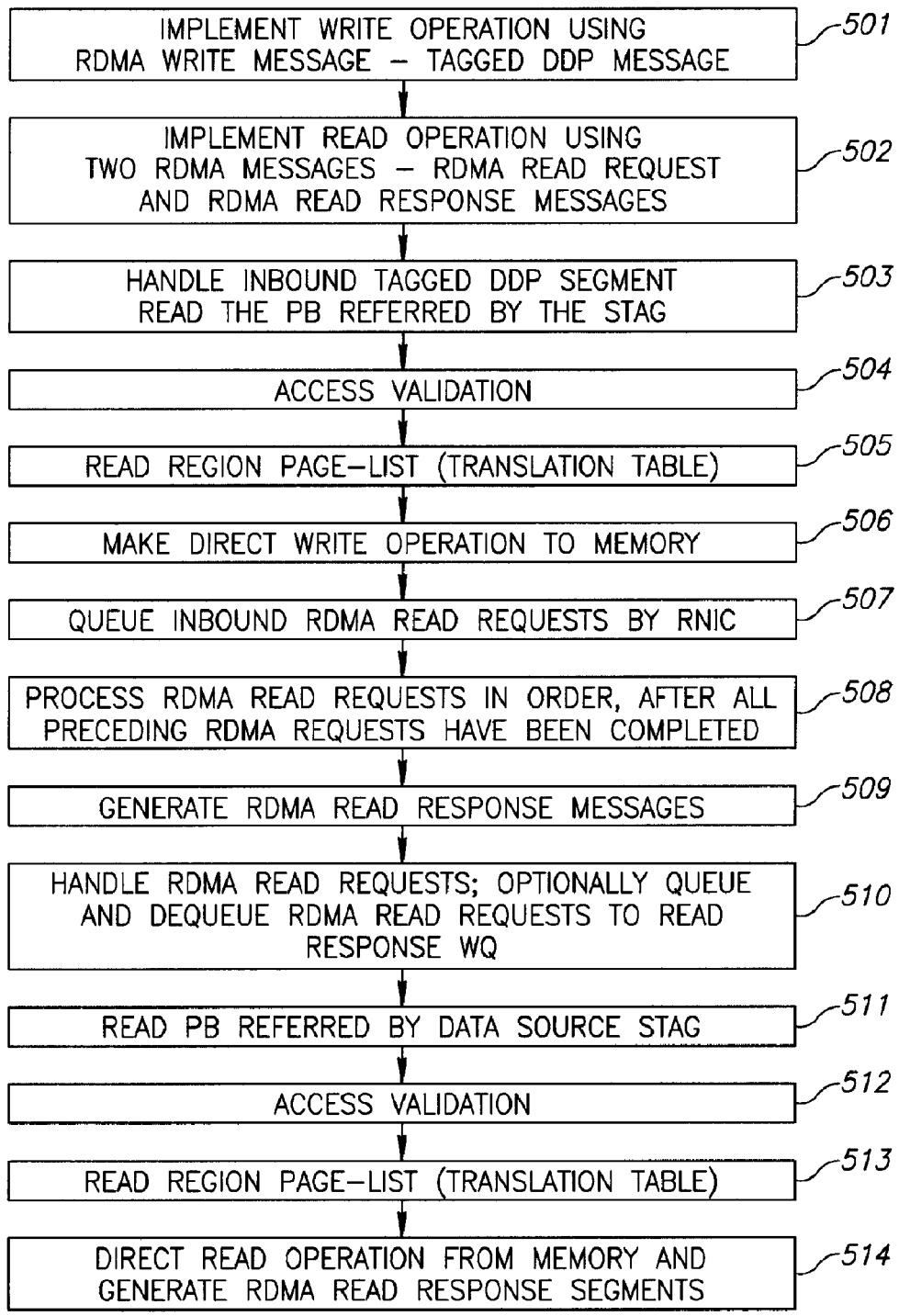
FIG. 5 is a simplified flow chart of remote memory access operations of RDMA, read and write.

Reference is now made to FIG. 5, which illustrates remote memory access operations of RDMA, namely, read and write. Remote write operation may be implemented using an RDMA write Message—Tagged DDP Message, which carries the data that should be placed to the remote memory (indicated by reference numeral 501).

The remote read operation may be implemented using two RDMA messages—RDMA read request and RDMA read response messages (indicated by reference numeral 502). RDMA read is an Untagged DDP Message, which specifies both the location from which the data needs to be fetched, and the location for placing the data. The RDMA read response is a Tagged DDP message which carries the data requested by the RDMA read request.

The process of handling inbound Tagged DDP segment (which is used both for RDMA write and RDMA read response) may include, without limitation, reading the PB referred by the STag (503), access validation (504), reading the region page-list (Translation Table) (505), and a direct write operation to the memory (506). Inbound RDMA read Requests may be queued by the RNIC (507). This queue is called the ReadResponse WorkQueue.

The RNIC may process RDMA read Requests in-order, after all preceding RDMA requests have been completed (508), and may generate RDMA read response messages (509), which are sent back to the requester.

The process of handling of RDMA read requests may include, without limitation, optional queuing and dequeuing of RDMA read requests to the ReadResponse WQ (510), reading the PB referred by the Data Source STag (STag which refers to the memory region from which to read) (511), access validation (512), reading the region page-list (Translation Table) (513), and a direct read operation from the memory and generating RDMA read response segments (514).

Figure 6:
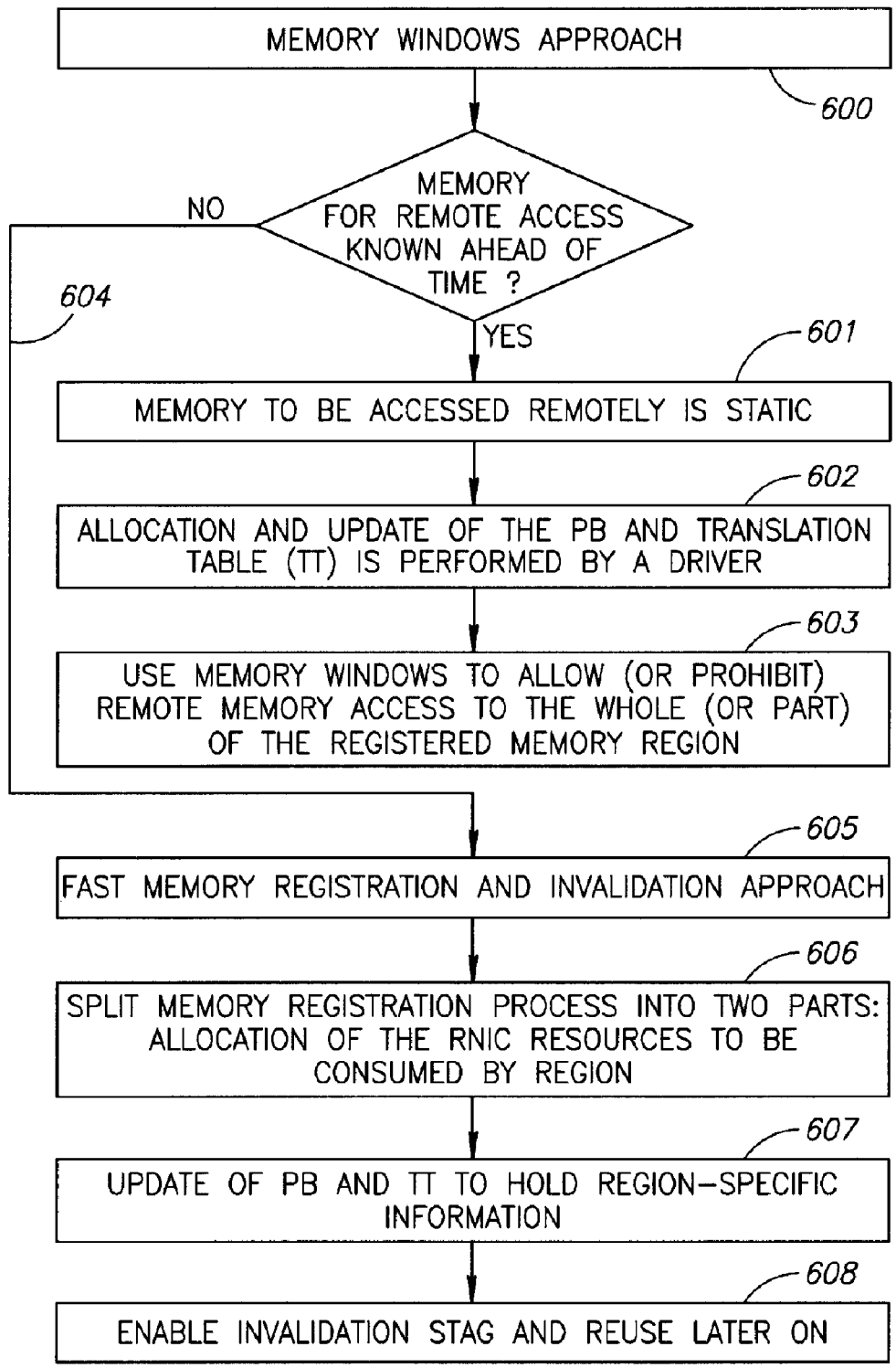
FIG. 6 is a simplified flow chart of memory registration in RDMA, which may enable accessing system memory both locally and remotely, in accordance with an embodiment of the present invention.

RDMA defines an Address Translation and Protection (ATP) mechanism that enables accessing system memory both locally and remotely. This mechanism is based on the registration of the memory that needs to be accessed, as is now explained with reference to FIG. 6.

Memory registration is a mandatory operation required for remote memory access. Two approaches may be used in RDMA: Memory Windows and Fast Memory Registration.

The Memory Windows approach (reference numeral 600) can be used when the memory (also referred to as the SCSI buffer memory) to be accessed remotely is static and which memory to be accessed is known ahead of time (601). In that case the memory region is registered using a so-called classic memory registration scheme, wherein allocation and update of the PB and Translation Table (TT) is performed by a driver (602) with or without hardware assist. This is a synchronous operation, which may be completed only when both PB and TT are updated with respective information. Memory Windows are used to allow (or prohibit) remote memory access to the whole (or part) of the registered memory region (603). This process is called Window Binding, and is performed by the RNIC upon consumer request. It is much faster than memory registration. However, Memory Windows are not the only way of allowing remote access. The Stag of the region itself can be used for this purpose, too. Accordingly, three mechanisms may be used to access registered memory: using statically registered regions, using windows bounded to these regions, and/or using fast registered regions.

If the memory for remote access is not known ahead of time (604), the use of pre-registered regions is not efficient. Instead RDMA defines a Fast Memory Registration and Invalidation approach (605).

This approach splits memory registration process into two parts—allocation of the RNIC resources to be consumed by the region (portion or all of the SCSI buffer memory) (606) (e.g., PB and portion of TT used to hold page-list), and update of PB and TT to hold region-specific information (607). The first operation 606 may be performed by software, and can be performed once for each Stag. The second operation 607 may be posted by software and performed by hardware, and can be performed multiple times (for each new region/buffer to be registered). In addition to Fast Memory Registration, RDMA defines Invalidate operation, which enables invalidating STag, and reusing it later on (608).

Both FastMemoryRegister and Invalidate operations are defined as asynchronous operations. They are posted as Work Requests to the RNIC Send Queue, and their completion is reported via an associated completion queue.

RDMA defines two types of Receive Queues—Shared and Not Shared RQ. Shared RQ can be shared between multiple connections, and Receive WRs posted to such a queue can be consumed by Send messages received on different connections. Not Shared RQ is always associated with one connection, and WRs posted to such RQ would be consumed by Sends received via this connection.

Figure 7:
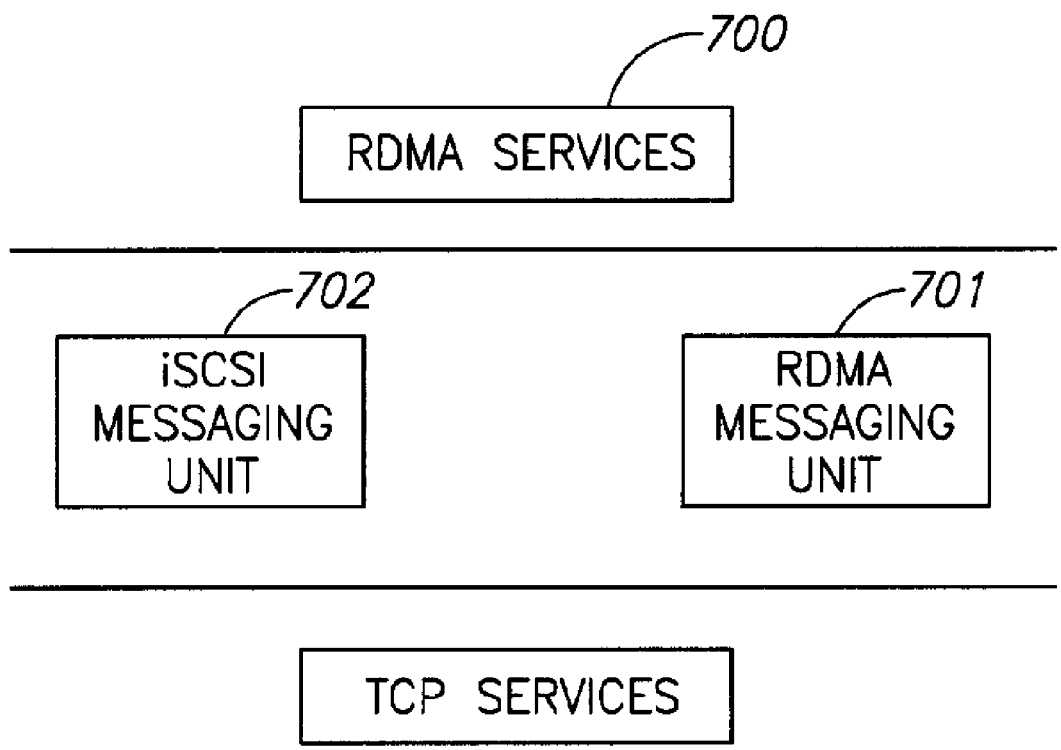
FIGS. 7 and 8 are simplified block diagram and flow chart illustrations, respectively, of an offload of the iSCSI data movement operation by RDMA supporting RNIC, in accordance with an embodiment of the present invention, including recovery from iSCSI data corruption.
Figure 8:
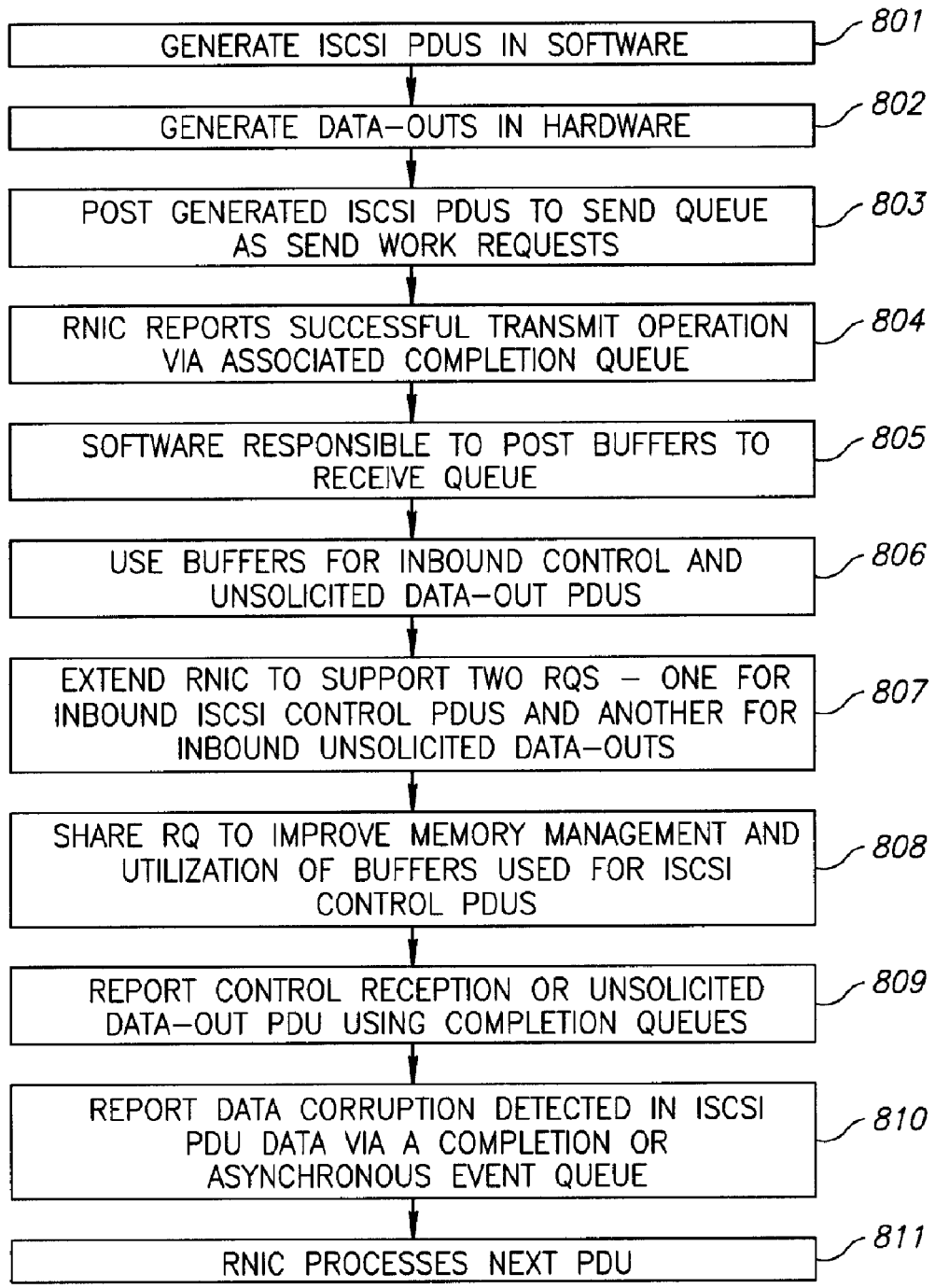

Reference is now made to FIGS. 7 and 8, which illustrate offload of the iSCSI data movement operation by RDMA supporting RNIC, in accordance with an embodiment of the present invention.

First reference is particularly made to FIG. 7. In accordance with a non-limiting embodiment of the present invention, the conventional RDMA offload function may be split into two parts: RDMA Service Unit 700 and RDMA Messaging Unit 701. RDMA Messaging Unit 701 may process inbound and outgoing RDMA messages, and may use services provided by RDMA Service Unit 700 to perform direct placement and delivery operations. In order to enable iSCSI offload, the iSCSI offload function may be replaced by and performed with an iSCSI Messaging Unit 702. iSCSI messaging unit 702 may be responsible for processing inbound and outgoing iSCSI PDUs, and may use services provided by RDMA Services Unit 700 to perform direct placement and delivery.

Services and interfaces provided by RDMA Service Unit 700 are identical for both iSCSI and RDMA offload functions.

Reference is now made to FIG. 8. All iSCSI PDUs are generated in software (reference numeral 801), except for Data-Outs, which are generated in hardware (802). The generated iSCSI PDUs may be posted to the Send Queue as Send Work Requests (803). RNIC reports completion of those WRs (successful transmit operation) via associated Completion Queue (804).

Software is responsible to post buffers to the Receive Queue (805) (e.g., with Receive Work Requests). It is noted that receive buffers may generally be posted before transmit buffers to avoid any unpleasant race situation. The particular order of posting send and receive buffers is not essential to the invention and can be left to the implementer. The buffers may be used for inbound control and unsolicited Data-Out PDUs (806). The RNIC may be extended to support two RQs—one for inbound iSCSI Control PDUs and another for inbound unsolicited Data-Outs (807). Software can use Shared RQ to improve memory management and utilization of the buffers used for iSCSI Control PDUs (808).

Control reception or unsolicited Data-Out PDU may be reported using completion queues (809). Data corruption or other errors detected in the iSCSI PDU data may be reported via a Completion Queue for iSCSI PDUs consuming WQEs in RQ, or via an Asynchronous Event Queue for the data movement iSCSI PDUs (810). The RNIC may then process the next PDU (811).

In accordance with a non-limiting embodiment of the invention, implementation of iSCSI semantics using RDMA-based mechanisms may be carried out with a unified software architecture for iSCSI and iSER based solutions.

Figure 8A:
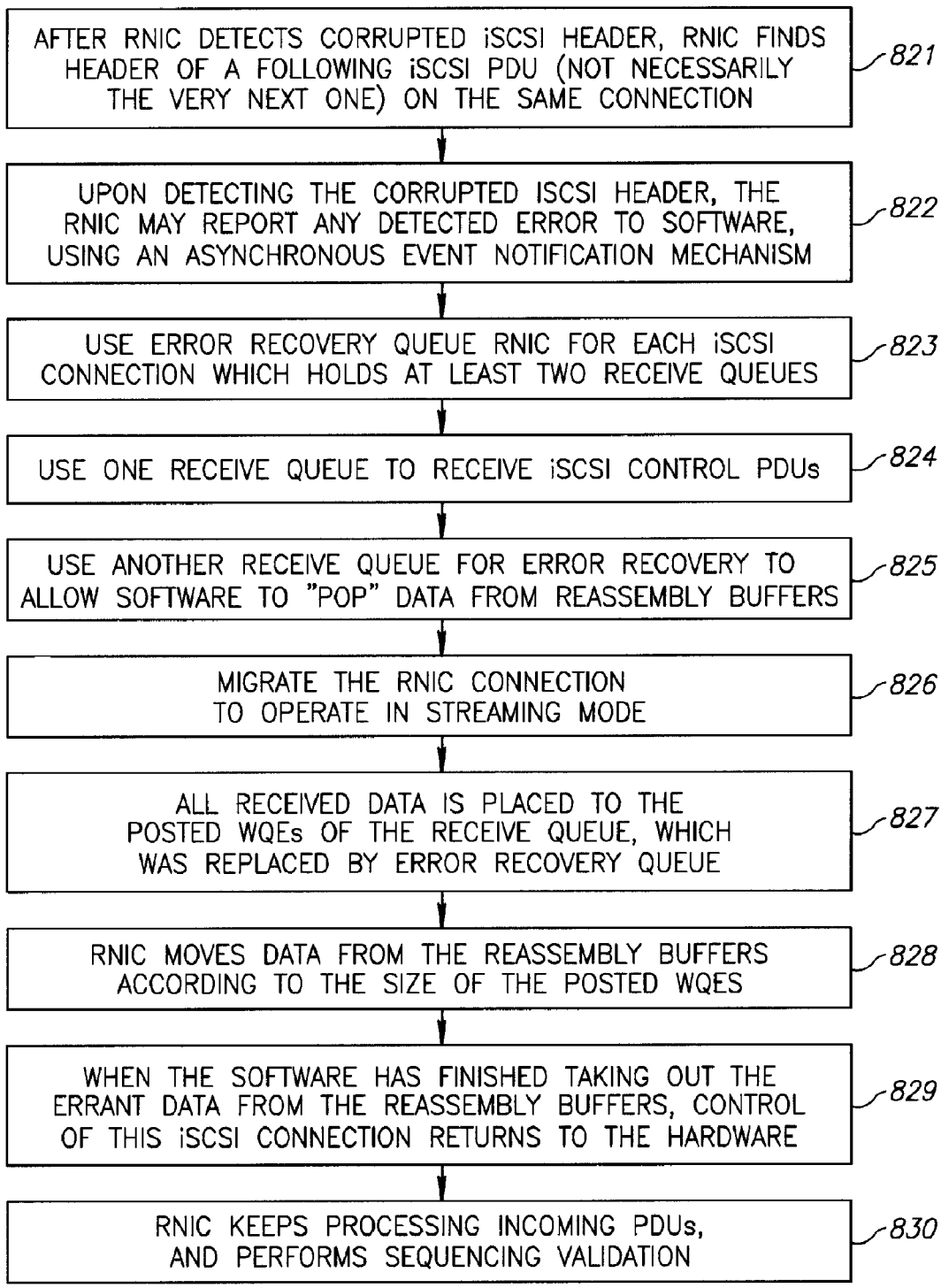
FIG. 8A is a simplified flow chart of recovery from iSCSI header corruption, in accordance with an embodiment of the present invention, which may employ a dedicated receive error queue for error recovery.

Reference is now made to FIG. 8A, which illustrates recovery from iSCSI header corruption, in accordance with an embodiment of the present invention. (Recovery from iSCSI data corruption was described above in steps 810-811.)

Recovery from iSCSI header corruption is a more involved task than recovery from iSCSI data corruption.

After the RNIC detects a corrupted iSCSI header, the RNIC may find the header of a following iSCSI PDU (not necessarily the very next one) on the same connection (step 821). To find the following iSCSI PDU, an iSCSI marker mechanism (or marker, for short) can be used, which may point to the closest following iSCSI PDU. In normal operational mode, the marker or markers may be stripped from the received iSCSI stream. The software or RNIC may take out data from the reassembly buffers until the following PDU has been reached.

Upon detecting the corrupted iSCSI Header, the RNIC may report any detected error to software, using an Asynchronous Event Notification mechanism (step 822). Instead of using a Receive Queue (as in step 810 above), the RNIC uses an Error Recovery Queue for each iSCSI connection which includes at least two receive queues (step 823). One of the receive queues may be used to receive iSCSI Control PDUs (step 824), as described above (step 810). Another receive queue may be used for error recovery to allow software to take out ("pop") the data from reassembly buffers (step 825). The error recovery queue usually does not have any posted WQE. Software may post WQEs to this receive queue when the connection is migrated to error recovery mode. It is noted that RDMA shared receive queues may be used instead of these at least two receive queues.

The RNIC connection may be migrated to operate in streaming mode (step 826). In this mode of operation, the iSCSI control of the connection may be passed to the software. The RNIC treats the connection as a regular connection working in streaming mode, meaning that all received data is placed to the posted WQEs of the receive queue, which was replaced by Error Recovery Queue (step 827). The RNIC may move the data from the reassembly buffers according to the size of the posted WQEs (step 828). As mentioned above, the software may find the header of the next known iSCSI PDU, using markers or any other mechanism, and may take out the data from the reassembly buffers until reaching this PDU.

When the software has finished taking out the errant data from the reassembly buffers, it may return control on this iSCSI connection back to the hardware (e.g., the RNIC) (step 829). The RNIC assumes that when it regains control, it starts with an aligned iSCSI PDU. The receive queue may be replaced to hold the initial receive queue. The RNIC may keep processing the incoming PDUs, and may perform sequencing validation (step 830), as described hereinbelow with reference to FIG. 12. The sequencing validation may ensure that SCSI commands that were affected by corruption of the iSCSI header will not be reported as completed, and that the software will have enough information to re-execute the affected SCSI commands.

Figure 9:
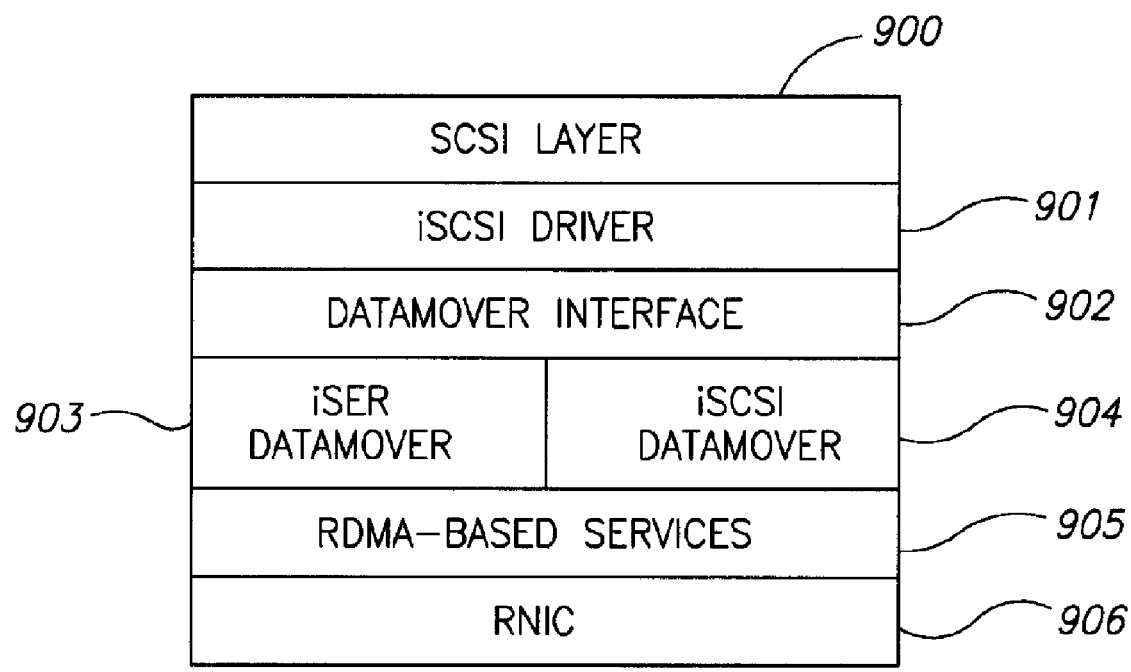
FIG. 9 is a simplified block diagram illustration of a software structure implemented using RDMA-based iSCSI offload, in accordance with an embodiment of the present invention.

Reference is now made to FIG. 9, which illustrates a software structure implemented using RDMA-based iSCSI offload. An SCSI layer 900 communicates via an iSCSI application protocol with an iSCSI driver 901. A datamover interface 902 interfaces with the iSCSI driver 901 and an iSER datamover 903 and an iSCSI datamover 904. The way in which datamover interface 902 interfaces with these elements may be in accordance with a standard datamover interface defined by the RDMA Consortium. One non-limiting advantage of such a software structure is a high level of sharing of the software components and interfaces between iSCSI and iSER software stacks. The datamover interface enables splitting data movement and iSCSI management functions of the iSCSI driver. Briefly, the datamover interface guarantees that all the necessary data transfers take place when the SCSI layer 900 requests transmitting a command, e.g., in order to complete a SCSI command for an initiator, or sending/receiving an iSCSI data sequence, e.g., in order to complete part of a SCSI command for a target.

The functionality of the iSCSI and iSER datamovers 903 and 904 may be offloaded with RDMA-based services 905 implemented by RNIC 906. In accordance with an embodiment of the invention, offloading the iSCSI functions using RDMA mechanisms includes offloading both iSCSI target and iSCSI initiator functions. Each one of the offload functions (target and/or initiator) can be implemented separately and independently from the other function or endpoint. In other words, the initiator may have data movement operations offloaded, and still communicate with any other iSCSI implementation of the target without requiring any change or adaptation. The same is true for the offloaded iSCSI target function. All RDMA mechanisms used to offload iSCSI data movement function are local and transparent to the remote side.

Figure 10:
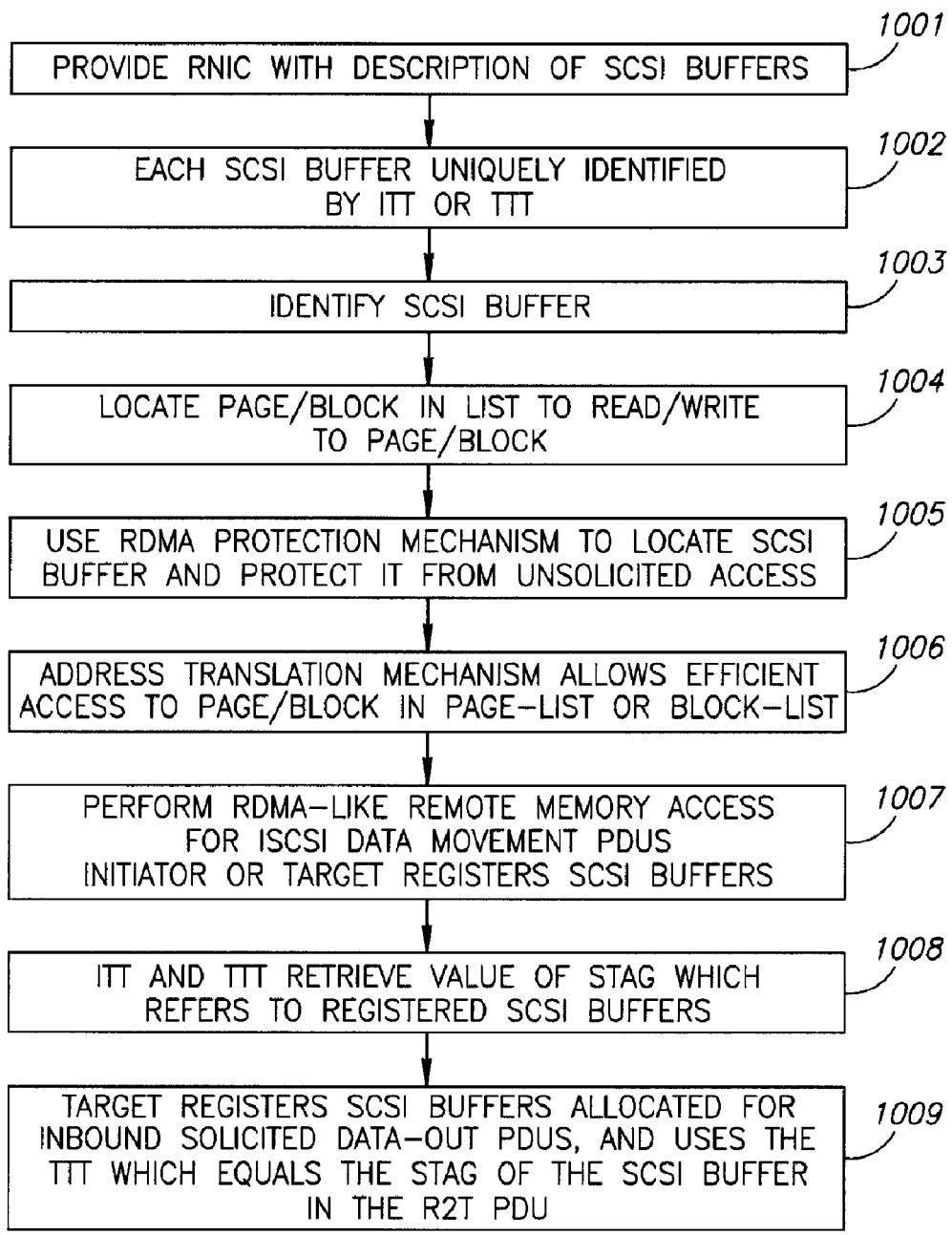
FIG. 10 is a simplified flow chart of direct data placement of iSCSI data movement PDUs to SCSI buffers without hardware/software interaction, in accordance with an embodiment of the invention.

Reference is now made to FIG. 10, which illustrates direct data placement of iSCSI data movement PDUs to the SCSI buffers without hardware/software interaction, in accordance with an embodiment of the invention. First, the RNIC is provided with a description of SCSI buffers (e.g., by the software) (reference numeral 1001). Each SCSI buffer may be uniquely identified by ITT or ITT respectively (1002). The SCSI buffer may consist of one or more pages or blocks, and may be represented by a page-list or block-list.

To perform direct data placement, the RNIC may perform a two-step resolution process. A first step (1003) includes identifying the SCSI buffer given ITT (or TTT), and a second step (1004) includes locating the page/block in the list to read/write to this page/block. Both the first and second steps may employ the Address Translation and Protection mechanism defined by RDMA, and use STag and RDMA memory registration semantics to implement iSCSI ITT and TTT semantics. For example, the RDMA protection mechanism may be used to locate the SCSI buffer and protect it from unsolicited access (1005), and the Address Translation mechanism may allow efficient access to the page/block in the page-list or block-list (1006). To perform RDMA-like remote memory access for iSCSI data movement PDUs, the initiator or target software may register the SCSI buffers (1007) (e.g., using Register Memory Region semantics). Memory Registration results in the Protection Block being associated with the SCSI buffer. In this manner, the Protection Block points to the Translation Table entries holding the page-list or the block-list describing the SCSI buffer. The registered Memory Region may be a zero-based type of memory region, which enables using the BufferOffset in iSCSI data movement PDUs to access the SCSI buffer.

The ITT and TTT, used in iSCSI Control PDUs, may get the value of STag referring to the registered SCSI buffers (1008). For example, the SCSI read command, generated by the initiator, may carry the ITT which equals the STag of the registered SCSI buffer. The corresponding Data-Ins and SCSI Response PDUs may carry this STag as well. Accordingly, the STag can be used to perform remote direct data placement by the initiator. For the SCSI write command, the target may register its SCSI buffers allocated for inbound solicited Data-Out PDUs, and use the ITT which equals the STag of the SCSI buffer in the R2T PDU (1009).

This non-limiting method of the invention enables taking advantage of existing hardware and software mechanisms to perform efficient offload of iSCSI data movement operations, preserving flexibility of those operations as defined in iSCSI specification.

Figure 11A:
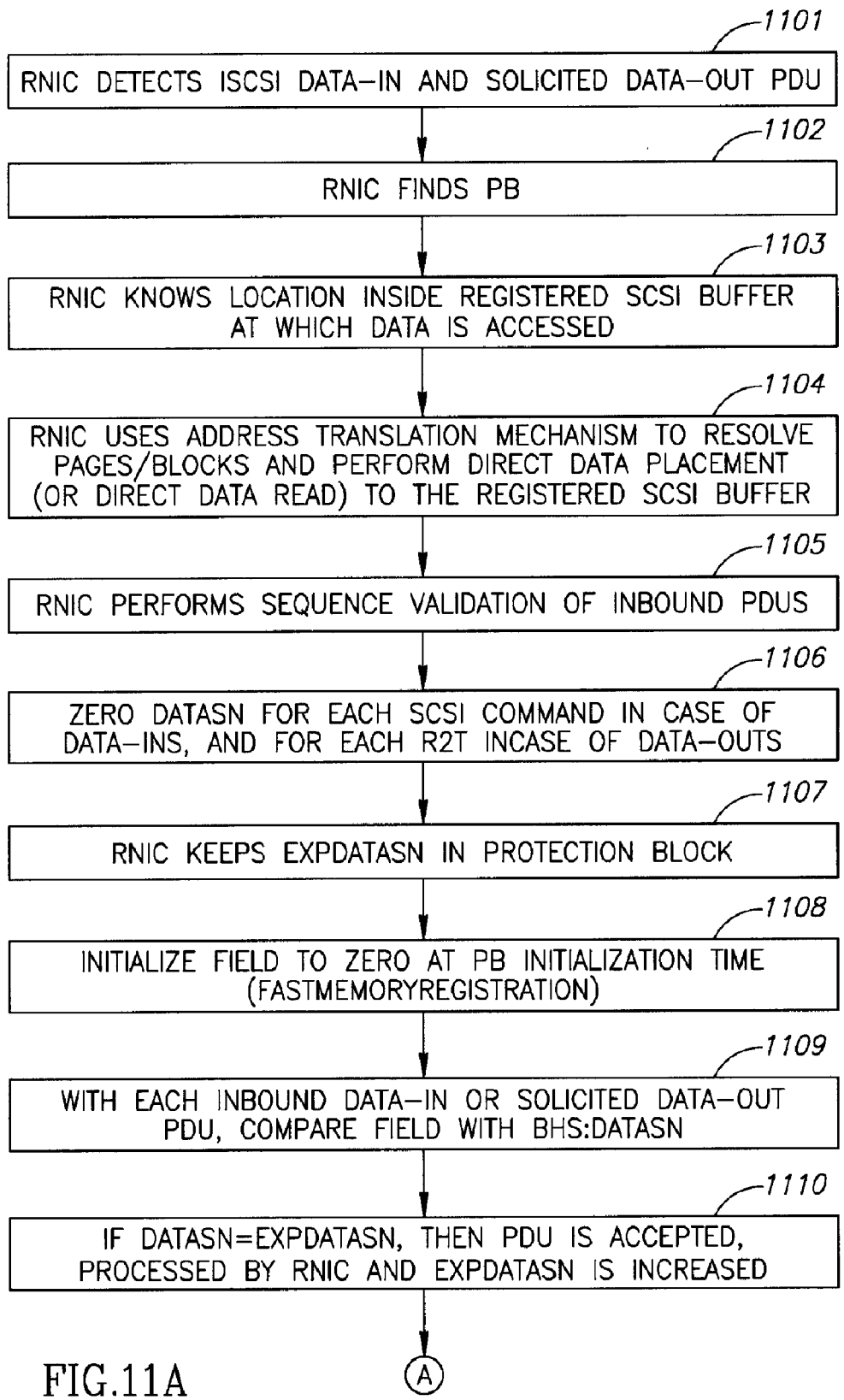
FIGS. 11A and 11B form a simplified flow chart of handling Data-Ins and solicited Data-Outs by the RNIC, and performing direct data placement of the iSCSI payload carried by those PDUs to the registered SCSI buffers, in accordance with an embodiment of the invention.
Figure 11B:
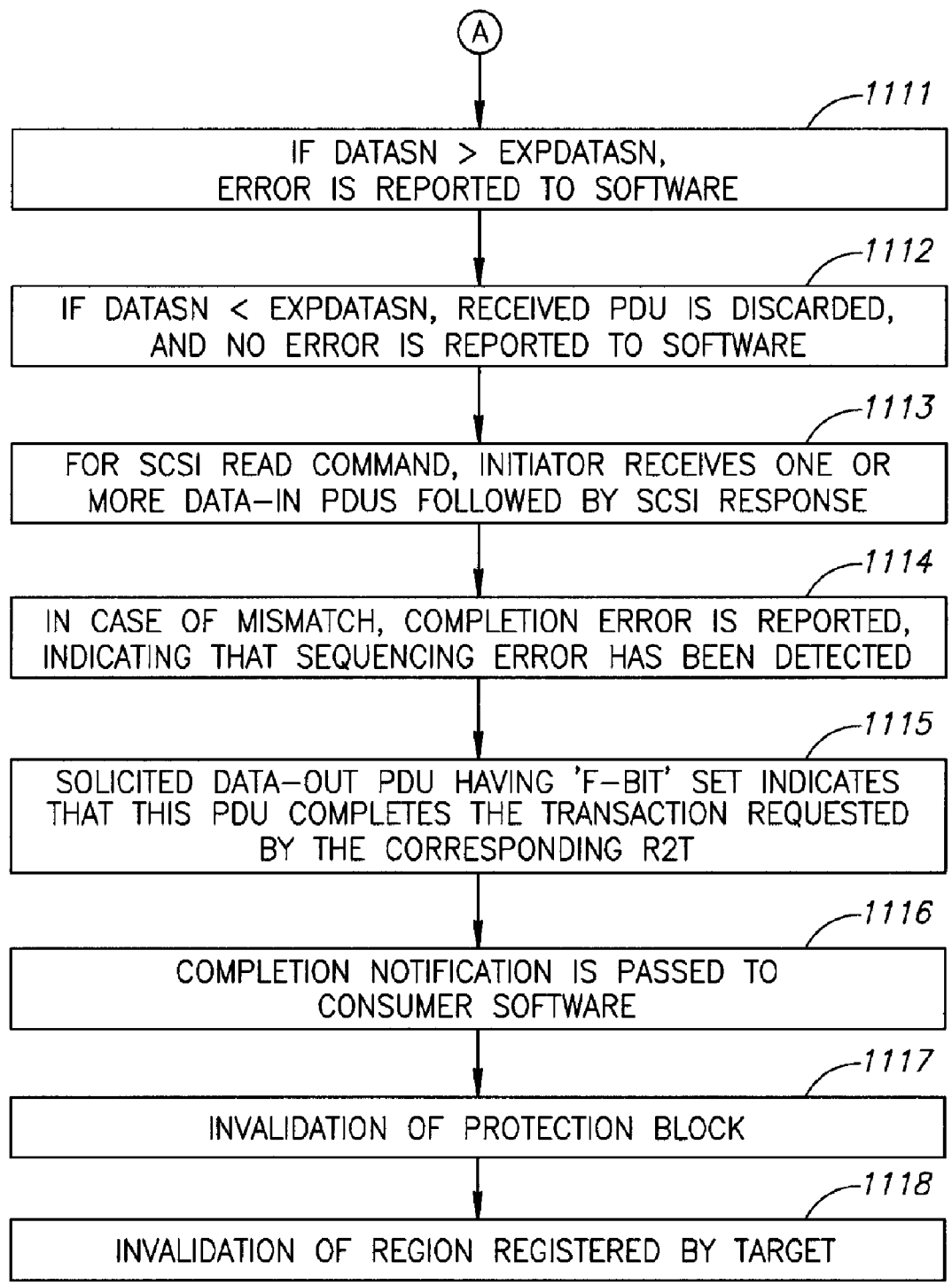

Reference is now made to FIGS. 11A and 11B, which illustrate handling Data-Ins and solicited Data-Outs by the RNIC, using the RDMA Protection and Address Translation approach described with reference to FIG. 10, and performing direct data placement of the iSCSI payload carried by those PDUs to the registered SCSI buffers, in accordance with an embodiment of the invention. In addition, the RNIC may trace data sequencing of Data-Ins and Data-Outs and enforce iSCSI sequencing rules defined by iSCSI specification and perform Invalidation of the PBs at the end of data transaction.

Inbound Data-Ins and solicited Data-Outs may be handled quite similarly by the RNIC (respectively by the initiator and target). Processing that is common to both of these PDU types is now explained.

RNIC first detects iSCSI Data-In and solicited Data-Out PDU (1101). This may be accomplished, without limitation, by using BHS:Opcode and BHS:TTT fields (TTT=h'FFFFFFFF' indicates that the Data-Out PDU is unsolicited, and such PDU is handled as Control iSCSI PDU, as described above). The RNIC may use BHS:ITT field for Data-In PDU and BHS:TTT for Data-Out PDU as a Stag (which was previously used by the driver, when it generated SCSI command, or R2T respectively).

The RNIC may find the PB (1102), for example, by using the index field of STag, which describes the respective registered SCSI buffer and validates access permissions. The RNIC may know the location inside the registered SCSI buffer at which the data is accessed (1103), for example, by using the BHS:BufferOffset. The RNIC may then use the Address Translation mechanism to resolve the pages/blocks and perform direct data placement (or direct data read) to the registered SCSI buffer (1104).

The consumer software (driver) is not aware of the direct placement operation performed by RNIC. There is no completion notification, except in the case of solicited Data-Out PDU having 'F-bit' set.

In addition to the direct placement operation (e.g., prior to it), the RNIC may perform sequence validation of inbound PDUs (1105). Both Data-In and Data-Out PDUs carry the DataSN. The DataSN may be zeroed for each SCSI command in case of Data-Ins, and for each R2T in case of Data-Outs (1106). The RNIC may keep the ExpDataSN in the Protection Block (1107). This field may be initialized to zero at PB initialization time (FastMemoryRegistration) (1108). With each inbound Data-In or solicited Data-Out PDU this field may be compared with BHS:DataSN (1109):

a. If DataSN=ExpDataSN, then the PDU is accepted, processed by RNIC and the ExpDataSN is increased (1110).

b. If DataSN >ExpDataSN, the error is reported to software (1111), such as by using Asynchronous Event Notification mechanism (Affiliated Asynchronous Error—Sequencing Error). The ErrorBit in PB may then be set, and each incoming PDU which refers to this PB (using STag) would be discarded starting from this point. This effectively means that iSCSI driver would need to recover on the iSCSI command level (or respectively R2T level).

c. The last case is reception of a ghost PDU (DataSN<ExpDataSN). In that case, the received PDU is discarded, and no error is reported to software (1112). This allows handling the duplicated iSCSI PDUs as defined by iSCSI specification.

(ExpDataSN is also referred to as the data structure sequence number and DataSN is the PDU sequence number.)

In the case of a SCSI read command, the initiator receives one or more Data-In PDUs followed by SCSI Response (1113). The SCSI Response may carry the BHS:ExpDataSN. This field indicates the number of Data-Ins prior to the SCSI Response. To complete enforcement of iSCSI sequencing rules, the RNIC may compare BHS:ExpDataSN with the PB:ExpDataSN referred by STag (ITT) carried by that SCSI Response. In case of a mismatch, the completion error is reported, indicating that sequencing error has been detected (1114).

The solicited Data-Out PDU having an 'F-bit' set indicates that this PDU completes the transaction requested by the corresponding R2T (1115). In that case, the completion notification is passed to the consumer software (1116). For example, the RNIC may skip one WQE from the Receive Queue, and add CQE to the respective Completion Queue, indicating completion of Data-Out transaction. The target software may require this notification in order to know whether the R2T operation has been completed or not, and whether it can generate a SCSI Response confirming that entire SCSI write operation has been completed. It is noted that this notification may be the only notification to the software from the RNIC when processing inbound Data-Ins and solicited Data-Out PDUs. The sequencing validation described above ensures that all Data-Outs have been successfully received and placed to the registered buffers. The case of losing the last Data-Out PDU (carrying the 'F-bit' set) may be covered by software (timeout mechanism).

The last operation which may be performed by the RNIC to conclude processing Data-In and solicited Data-Out PDUs is invalidation of the Protection Block (1117). This may be done for the Data-In and solicited Data-Out PDUs having 'Fbit' set. The invalidation may be performed on the PB referred by the STag gathered from the PDU header. The invalidated STag may be delivered to the SCSI driver either using CQE for solicited Data-Outs, or in the header of SCSI Response concluding SCSI write command (ITT field). This allows the iSCSI driver to reuse the freed STag for the next SCSI command.

Invalidation of the region registered by target (1118) may also similarly be carried out. It is noted that an alternative approach for invalidation could be invalidation of the PB referred by the STag (ITT) in the received SCSI Response.

Figure 12:
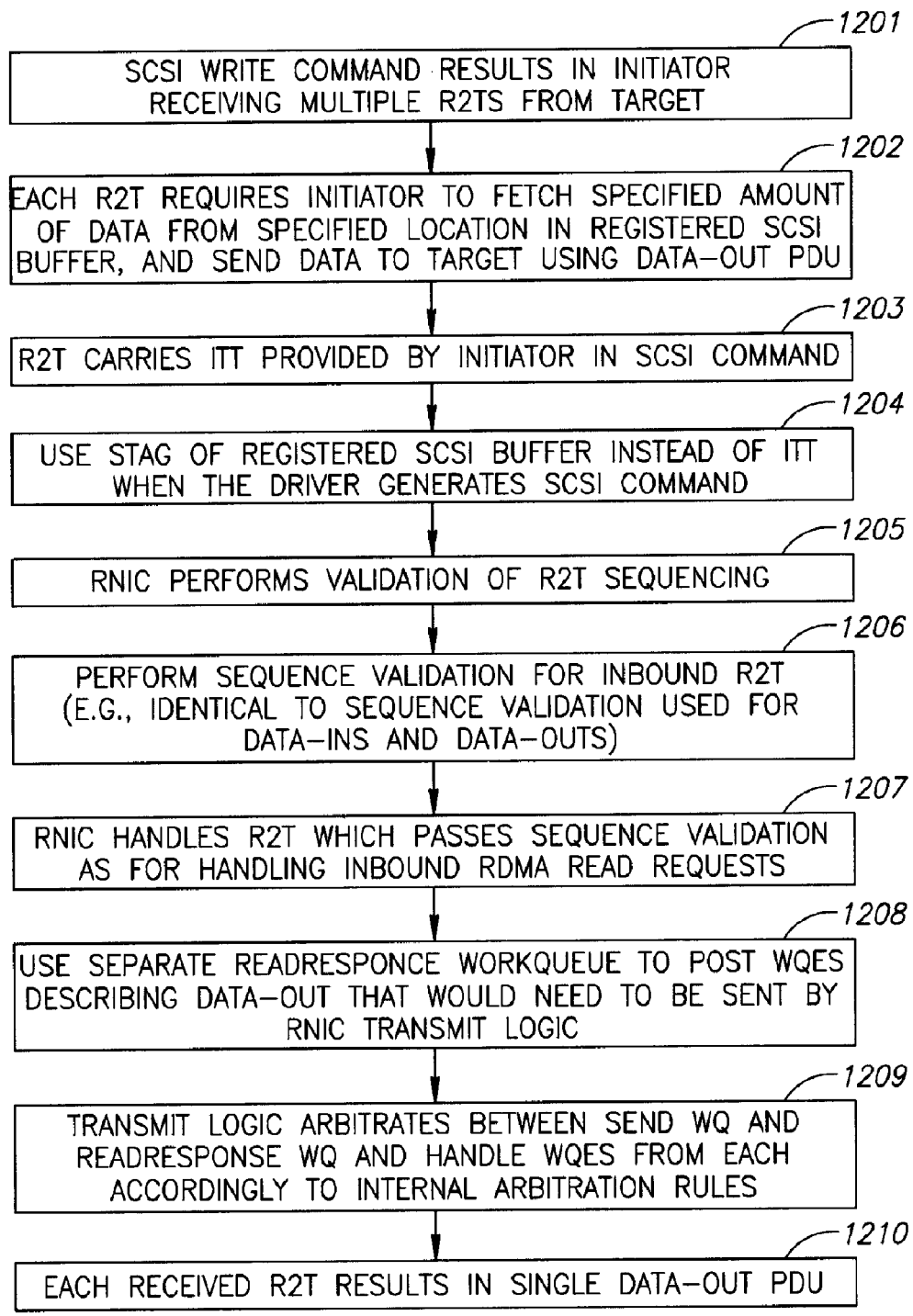
FIG. 12 is a simplified flow chart of handling inbound R2Ts in hardware, and generating Data-Out PDUs, in accordance with an embodiment of the invention.

Reference is now made to FIG. 12, which illustrates handling of inbound R2Ts in hardware, and generation of Data-Out PDUs, in accordance with an embodiment of the invention.

The SCSI write command can result in the initiator receiving multiple R2Ts from the target (1201). Each R2T may require the initiator to fetch a specified amount of data from the specified location in the registered SCSI buffer, and send this data to the target using Data-Out PDU (1202). The R2T carries ITT provided by the initiator in SCSI command (1203). As described hereinabove, the STag of the registered SCSI buffer may be used by the driver instead of ITT when the driver generates the SCSI command (1204).

The R2T PDU may be identified using the BHS:Opcode field. RNIC may perform validation of the R2T sequencing (1205), using the BHS:R2TSN field. The RNIC holds the ExpDataSN field in the PB. Since for unidirectional commands the initiator can see either R2Ts or Data-Ins coming in, the same field can be used for sequencing validation. Sequence validation for inbound R2Ts may be identical to the process of sequence validation used for Data-Ins and Data-Outs discussed hereinabove (1206).

The RNIC may handle R2T which passed sequence validation using the same mechanism as for handling inbound RDMA read Requests (1207). The RNIC may use a separate readResponse WorkQueue to post WQEs describing Data-Out that would need to be sent by RNIC transmit logic (1208) (in case of RDMA read Request, RNIC may queue WQEs describing RDMA read Response). Transmit logic may arbitrate between Send WQ and readResponse WQ, and may handle WQEs from each of them accordingly to internal arbitration rules (1209).

Each received R2T may result in a single Data-Out PDU (1210). The generated Data-Out PDU may carry the data from the registered SCSI buffer referred by BHS:ITT (driver placed there STag at SCSI command generation). The BHS: BufferOffset and BHS:DesireDataTransferLength may identify the offset in the SCSI buffer and a size of the data transaction. 101 When the RNIC transmits the Data-Out for the R2T PDU with F-bit set, the RNIC may invalidate the Protection Block referred by STag (ITT) after the remote side confirmed successful reception of that Data-Out PDU. The STag used for this SCSI write command may be reused by software when the corresponding SCSI Response PDU would be delivered.

An alternative approach for the memory region invalidation could be invalidation of the PB referred by STag (ITT) in received SCSI Response.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   detecting and managing an error detected in an iSCSI (Internet Small Computer System Interface) PDU (Protocol Data Unit) by using a RDMA (Remote Direct Memory Access) dedicated receive error queue for error recovery.

2. The method according to claim 1, wherein said error comprises data corruption in iSCSI PDU data, and wherein if the iSCSI PDU consumes WQEs (work queue elements) in a receive queue, the error is reported via at least one of a completion queue and an Asynchronous Event Queue.

3. The method according to claim 1, wherein said error comprises header corruption in iSCSI PDU data.

4. The method according to claim 3, further comprising reporting the error using an Asynchronous Event Notification mechanism.

5. The method according to claim 4, further comprising using a RNIC (Remote-direct-memory-access-enabled Network Interface Controller) for each iSCSI connection which comprises an Error Recovery Queue having at least two receive queues, wherein one of the receive queues is used to receive iSCSI Control PDUs and another receive queue is used for error recovery to allow software to take out data from reassembly buffers.

6. The method according to claim 1, further comprising performing sequencing validation of the iSCSI PDU.

7. A computer program product comprising:
   instructions for detecting and managing an error detected in an iSCSI PDU by using a RDMA dedicated receive error queue for error recovery.

8. The computer program product according to claim 7, wherein said error comprises data corruption in iSCSI PDU data, and wherein if the iSCSI PDU consumes WQEs in a receive queue, and the instructions include instructions for reporting the error via a completion queue.

9. The computer program product according to claim 7, wherein said error comprises data corruption in iSCSI PDU data, and wherein if the iSCSI PDU consumes WQEs in a receive queue, and the instructions include instructions for reporting the error via an Asynchronous Event Queue.

10. The computer program product according to claim 7, wherein said error comprises header corruption in iSCSI PDU data.

11. The computer program product according to claim 10, wherein the instructions include instructions for reporting the error using an Asynchronous Event Notification mechanism.

12. The computer program product according to claim 11, further comprising instructions for implementing a RNIC for each iSCSI connection, the RNIC comprising an Error Recovery Queue having at least two receive queues, wherein one of the receive queues is used to receive iSCSI Control PDUs and another receive queue is used for error recovery to allow software to take out data from reassembly buffers.

13. The computer program product according to claim 12, further comprising instructions for operating the RNIC in streaming mode, wherein all received data is placed to posted WQEs of the Error Recovery Queue.

14. The computer program product according to claim 7, further comprising instructions for performing sequencing validation of the iSCSI PDU.

15. A system comprising:
   an RDMA Service Unit;
   an RDMA Messaging Unit operative to process inbound and outgoing RDMA messages, and to use services provided by said RDMA Service Unit to perform direct placement and delivery operations; and
   an iSCSI Messaging Unit operative to perform an iSCSI offload function and to process inbound and outgoing iSCSI PDUs, said system being adapted to detect and manage an error detected in an iSCSI PDU by using a RDMA dedicated receive error queue for error recovery.

16. The system according to claim 15, wherein said error comprises data corruption in iSCSI PDU data, and wherein if the iSCSI PDU consumes WQEs in a receive queue, the system comprises at least one of a completion queue and an Asynchronous Event Queue through which the error is reported.

17. The system according to claim 15, wherein said error comprises header corruption in iSCSI PDU data.

18. The system according to claim 17, wherein the system comprises an Asynchronous Event Notification mechanism through which the error is reported.

19. The system according to claim 18, further comprising a RNIC for each iSCSI connection, the RNIC comprising an Error Recovery Queue having at least two receive queues, wherein one of the receive queues is used to receive iSCSI Control PDUs and another receive queue is used for error recovery to allow software to take out data from reassembly buffers.

20. The system according to claim 15, wherein the system is adapted to perform sequencing validation of the iSCSI PDU.

* * * * *